United States Patent [19]
Rowlette et al.

[11] Patent Number: 5,397,970
[45] Date of Patent: Mar. 14, 1995

[54] INTERFACE CIRCUIT HAVING IMPROVED ISOLATION AMONG SIGNALS FOR USE WITH A VARIABLE SPEED ELECTRICALLY COMMUTATED FAN MOTOR

[75] Inventors: Mitchell R. Rowlette, Berea; Darryel L. Price, Bardstown; Craig M. Nold, Lexington, all of Ky.

[73] Assignee: Texas Instruments Incorporated, Dallas, Tex.

[21] Appl. No.: 873,093

[22] Filed: Apr. 24, 1992

[51] Int. Cl.⁶ .............................................. H02H 7/08
[52] U.S. Cl. .................................... 318/254; 361/23
[58] Field of Search ............... 318/254, 439, 138, 102, 318/778-812, 772, 791; 417/17, 53, 45; 361/23, 33, 29, 111; 388/811, 909, 819, 930

[56] References Cited

U.S. PATENT DOCUMENTS

| | | | |
|---|---|---|---|
| 4,352,635 | 10/1982 | Saunders | 318/102 X |
| 4,653,285 | 3/1987 | Pohl | 361/33 X |
| 4,680,513 | 7/1987 | Kennedy | 318/285 |
| 4,856,286 | 8/1989 | Sulfstele et al. | 318/811 X |
| 4,922,171 | 5/1990 | Ohi | 318/462 X |
| 4,977,363 | 12/1990 | Takada et al. | 318/771 |
| 5,049,801 | 9/1991 | Potter | 318/772 X |
| 5,125,067 | 6/1992 | Erdman | 388/811 |
| 5,159,255 | 10/1992 | Weber | 318/812 X |
| 5,160,874 | 11/1992 | Lyons et al. | 318/268 |

OTHER PUBLICATIONS

Fink et al. Standard Handbook for Electrical Engineers, 1968, McGraw-Hill, see 18–137, 18–147.

*Primary Examiner*—Jonathan Wysocki
*Attorney, Agent, or Firm*—Russell E. Baumann; Richard L. Donaldson; René E. Grossman

[57] ABSTRACT

A low voltage terminal board interfaces a fan motor with a field thermostat. The board includes a power supply providing a 24 volt DC power source for driving an electronic air cleaner relay and fan motor control lines and a 5 volt DC power source for providing optical isolation and timing logic. Several heater stage signals are connected to a diode interlock network so that no matter which signal is generated the first electric stage heater is energized. A first optically coupled isolator receives a 240 volt AC input whenever the first stage electric heater is energized with the isolator output controlling energization of a heat or medium speed operation of the fan motor. Second and third optically coupled isolators receive a 24 volt AC input indicative of continuous fan operation and compressor operation respectively with the outputs controlling energization of low (on/off) fan speed operation and high speed fan operation respectively. A timing circuit is interconnected between the third optically coupled isolator and the high speed fan terminal to provide a delayed off period of fan operation. Diode interconnections ensure that the on/off terminal is energized anytime the high speed terminal or the first stage electric heater is energized and anytime the on/off line is energized the electronic air cleaner relay is energized.

12 Claims, 4 Drawing Sheets

INTERFACE CIRCUIT HAVING IMPROVED ISOLATION AMONG SIGNALS FOR USE WITH A VARIABLE SPEED ELECTRICALLY COMMUTATED FAN MOTOR

BACKGROUND OF THE INVENTION

1. Field of the Invention

This invention relates generally to heating, ventilating and air conditioning (HVAC) systems and more specifically to an interface circuit for use in controlling the speed of a variable speed electrically commutated fan motor.

2. Brief Description of the Prior Art

Electrically commutated motors or ECM's are DC motors having internal inverters in which low voltage control signals are used to select the motor speeds. However, the use of such a motor in HVAC systems such as a heat pump blower assembly, for example, leads to certain problems. In HVAC systems there are many paths which can conduct current and since this type of motor used for the fan will run, albeit at reduced efficiency, on incomplete portions of a sine wave, prior art approaches have required various discrete components to avoid spurious signals from causing unintended energization of the motor. In a heat pump it is necessary to energize the fan motor whenever electric heat has been energized. This requires the detection of 240 VAC power being applied to the electric heating element and subsequently energizing the fan motor. Further, when a "continuous fan" mode of operation is selected the lowest fan speed, or an on/off signal to the ECM, must be the only signal energized.

A prior art method for accomplishing this employs a transformer for transforming the 240 VAC signal to 24 VAC which is used to drive the ECM control lines. However, it is necessary to isolate the low voltage signal from the continuous (low) speed fan operation from another low voltage signal calling for high speed fan operation. Improper isolation can result in high speed fan operation when the low speed fan is selected. This system, which uses an additional transformer for a heat detection circuit, is inherently costly using two separate transformers as well as being unreliable.

It is an object of the present invention to provide a circuit which does not have the above limitations of the prior art, a circuit which is of low cost and yet reliable for controlling the variable speeds of an ECM motor.

SUMMARY OF THE INVENTION

Briefly, in accordance with the invention an interface circuit used to control the energization of an electrically commutated fan motor having low, medium and high speed operations in a heating, ventilating, air conditioning (HVAC) system comprises a power supply for providing a 24 volt DC and a 5 volt DC source. A timer provides a delay in deenergization of the fan motor once energized other than when the fan is energized in the continuous fan mode. Input signals include a Y signal indicating that the HVAC compressor is running and when present it energizes an optically coupled isolator turning on the high speed of the fan motor. Another signal G, signifying the continuous fan mode, is used to energize another optically coupled isolator which in turn causes an on/off terminal to be energized turning the fan motor on at its low speed. According to a feature of the invention if any of the speed taps of the motor is energized then the on/off terminal, and therefore the fan motor, is also energized through diode interconnections which also serve to block other selected voltages. The circuit also uses a diode interlock arrangement with several electric heat control signals, W2, W3 and E to ensure that even if miswired the first stage electric heat control signal is energized, i.e. the signals W2DC and W2GND. This in turn ensures that whenever a stage of electric heat is energized the fan is also energized. According to another feature of the invention whenever the first stage of electric heat is energized a line called AC interlock (ACINT) a 240 volt AC input, is energized in turn energizing another optically coupled isolator which will turn on the heat (medium) speed of the fan. According to yet another feature of the invention a relay which controls the energization of an electronic air cleaner is energized whenever any of the signals for the fan are energized.

DESCRIPTION OF THE PREFERRED EMBODIMENT

Figure 1:
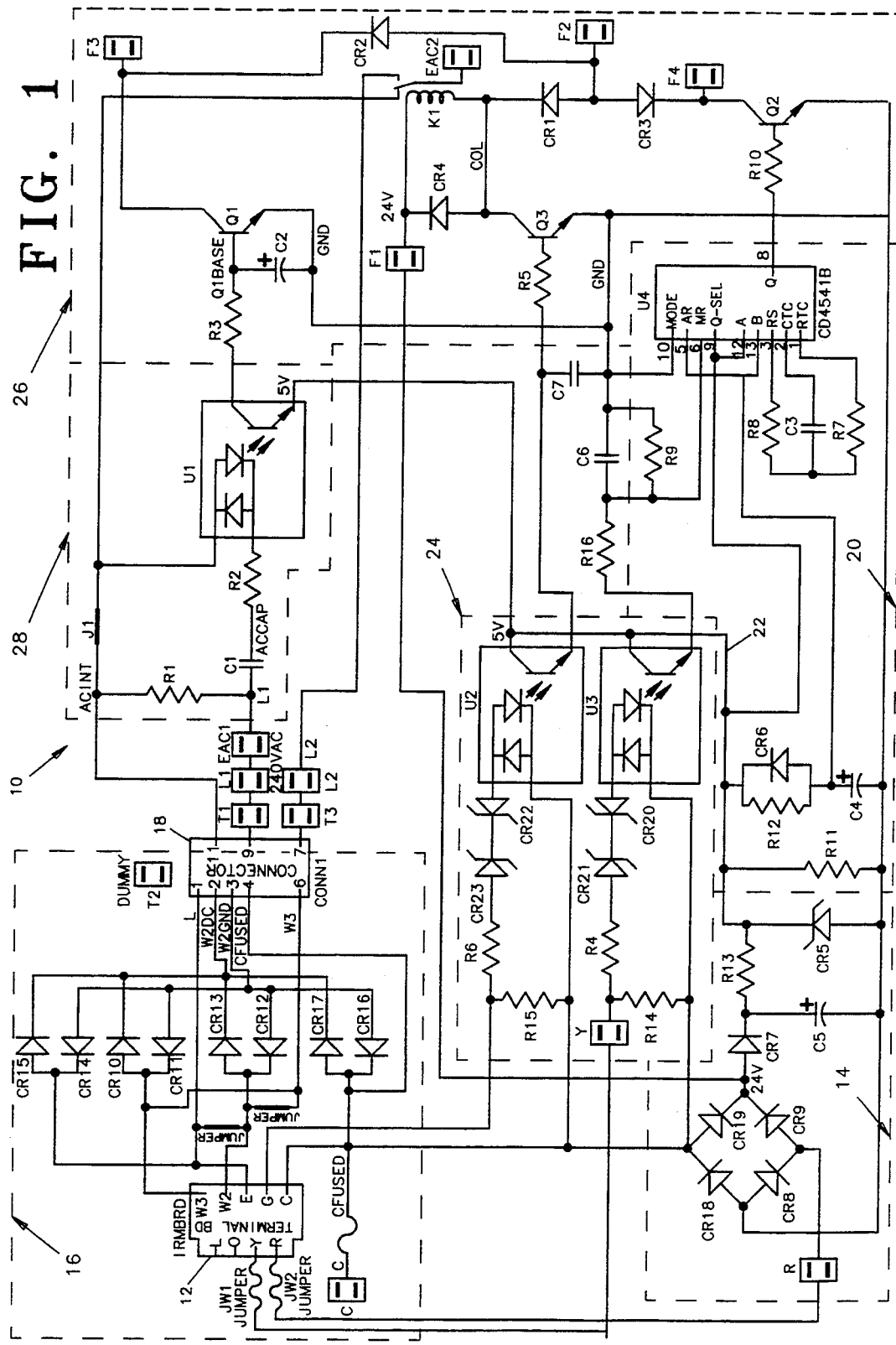
FIG. 1 is a schematic circuit of a fan coil control module made in accordance with the invention.

With particular reference to FIG. 1 numeral 10 designates a control module having a low voltage terminal board 12 with terminals R, Y, O, L and C, G, E, W2 and W3. These are all 24 volt AC signals with respect to common C. A signal at Y signifies that the compressor motor of the system is running. R represents the control voltage which is connected to the room thermostat. R and C are connected to the 24 volt taps of a 240/24 volt transformer (not shown) with C being the common of the transformer which is tied to chassis ground. A signal at G will result in continuous fan energization. A signal at W2 signifies energization of a first stage of electric heat. A signal at W3 signifies energization of a second stage of electric heat and a signal at E signifies energization of emergency heat. Terminals O and L are wiring points for control signals which do not involve the control circuit of the instant invention.

Figure 2:
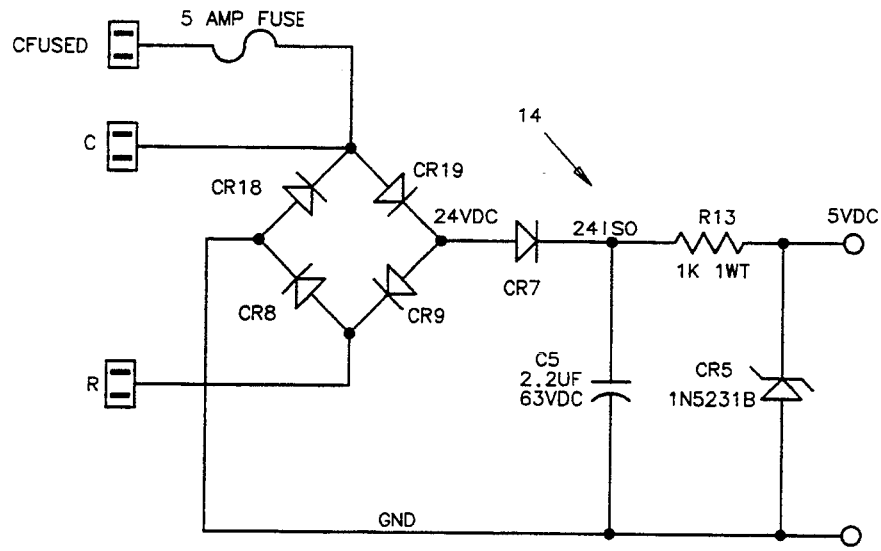
FIG. 2 is an enlarged schematic of the power supply circuit portion of FIG. 1.

With particular respect to FIG. 2, power supply circuit 14 includes a full wave bridge comprising diodes CR18, CR19, CR8 and CR9 which converts the 24 volt AC power from the transformer to a 24 volt DC signal. Diode CR7 isolates a filter capacitor C5 from the signal and zener diode CR5 provides a 5 volt DC supply which is used for optical isolation and timing logic to be described below.

Figure 3:
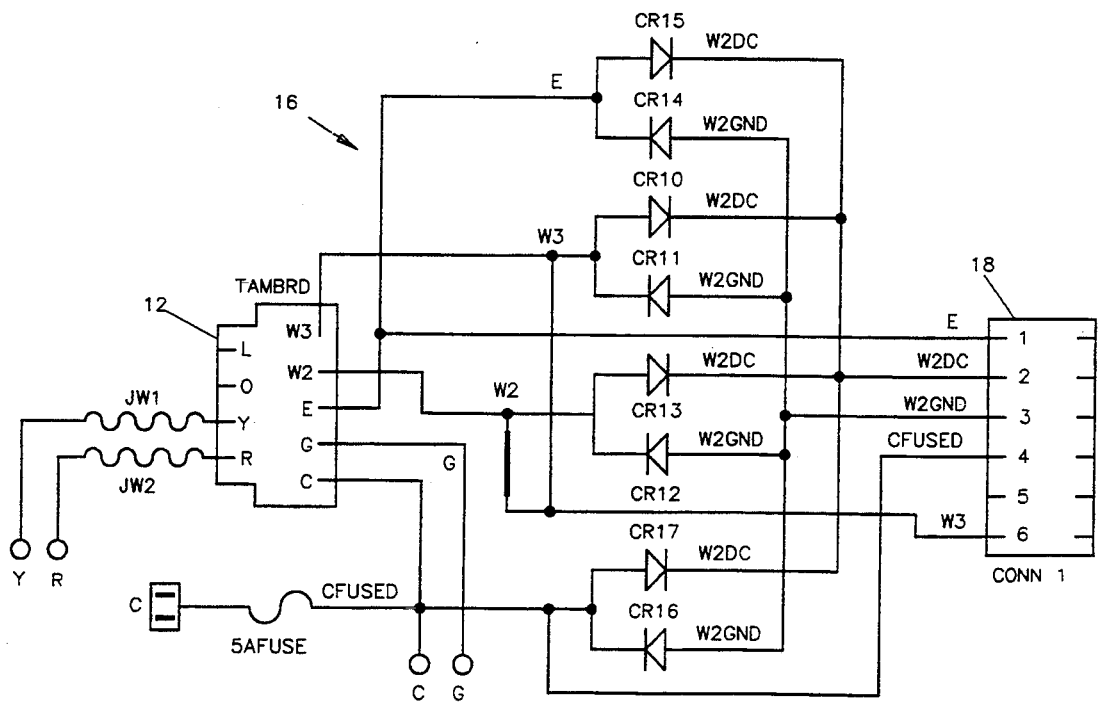
FIG. 3 is an enlarged schematic of a diode interlock circuit portion of FIG. 1.

With respect to FIG. 3, diode interlock circuit portion 16 comprises diodes CR10–CR17 connected between terminal board 12 and a connector 18. The interlock functions to ensure that even if the thermostat wires are miswired with respect to the electric heat controls, W2, W3 and E that the first stage of electric heat control signal W2DC, W2GND will be energized. As will be explained below, this will ensure that whenever a stage of electric heat is energized the fan will also be energized. Terminal W2 is connected to diodes CR12 and CR13 with the cathode of CR13 connected to pin 2 of connector 18 through a line W2DC and the anode of diode CR12 connected to pin 3 through a line W2GND. Terminal W3 is similarly connected to diodes CR10 and CR11 with the cathode of diode CR10 connected to pin 2 through line W2DC and the anode of diode CR11 connected to pin 3 through line W2GND. W3 is also coupled directly to pin 6 of connector 18. Terminal E is connected to diodes CR14 and CR15 with the cathode of diode CR15 connected to pin 2 through line W2DC and the anode of diode CR14 to pin 3 through line W2GND. Terminal E is also directly coupled to pin 1 of connector 18. Terminal C is connected to the transformer tap through a 5 amp fuse and through line CFUSED to diodes CR17, CR16 with the cathode of diode CR17 connected to pin 2 through line W2DC and the anode of diode CR16 to pin 3 through line W2GND. Terminal C is also connected to pin 4 of connector 18. Signals W2DC, W2GND, pins 2 and 3 respectively of connector 18, are adapted for connection to a time delay relay (not shown) which, after a selected time delay, connects line 22 to line ACINT whenever electric heat is called for as well as energizing the first stage of electric heat.

Jumpers JW1 and JW2 are merely connections to wiring taps Y and R respectively on the circuit board 10. Dummy terminal T2 located in FIG. 1 above connector 18 provides a place to connect the unused tap on the 24 volt AC transformer. FIG. 3 also shows a series of dash lines between E and W2 and between W2 and W3 which are breakaway tabs on board 10. This is provided so that the module can be used with various types of room thermostats available in the market. That is, some thermostats have multiple heat stages and others have a single heat stage. With a single heat stage thermostat terminals E and W2 are common to each other so a signal in either line would energized both stages. The tab between terminals W2 and W3 is useful with an outdoor thermostat, that is, the tab would be broken and such a thermostat would be connected between W2 and W3 so that additional heat could be obtained when ambient temperature goes below a selected level.

Further information on the diode interlock and its function can be obtained in copending application Ser. No. 07/580,747 assigned to the assignee of the present invention and which is incorporated herein by this reference.

Figure 4:
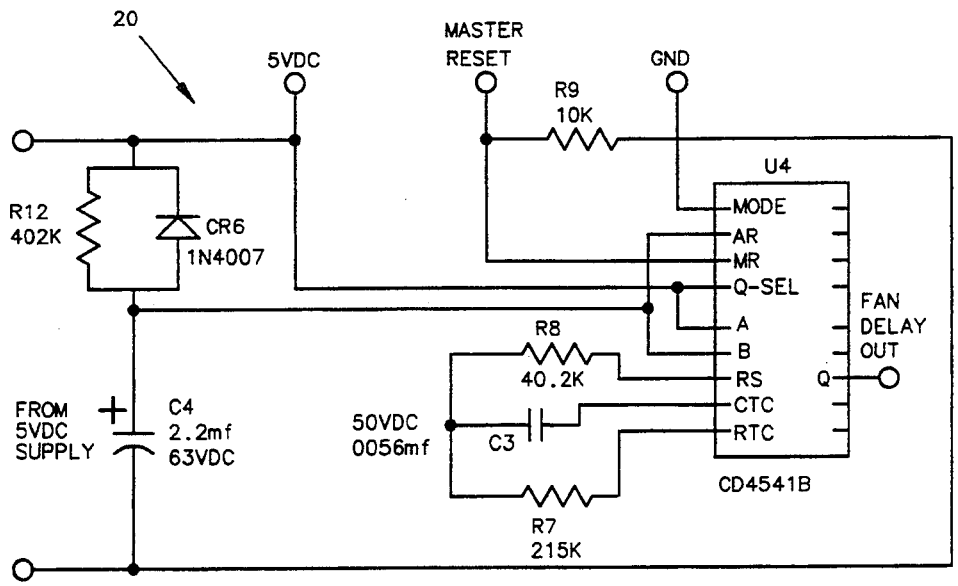
Fig. 4 is an enlarged time delay circuit portion of FIG. 1.

The time delay circuit portion 20 shown in FIGS. 1 and 4 comprises a programmable timer U4, a CMOS CD4541B having an internal oscillator coupled to pins 1, 2 and 3 (RTC, CTC and RS respectively). The oscillator frequency is set by resistor R7 and capacitor C3 and stabilized by resistor RS. The rate at which the time expires is selected by the two input signals at pins A and B. If pin A is at logic 1 and pin B is at logic 0 then the time delay is at a first, relatively short period, whereas if pin A and pin B are both at a logic 1 the time delay is at a second, relatively long period. When power is first applied to the circuit, capacitor C4, coupled to pin B, will be discharged. Pin 5, the AR or automatic reset line is also tied to capacitor C4. If AR is at a logic 0 then the timer will do an automatic reset. Resistor R12 and capacitor C4 form an RC timing charge so that pin B and AR will lag the power supply coming up resulting in the first, short time delay. When capacitor C4 becomes charged normal operation of the circuit takes place with the timer providing the second, relatively long time delay for a purpose to be explained infra.

When a 24 VAC signal occurs on Y optically coupled isolator U3 becomes energized and a signal is driven through resistor R16 that charges capacitor C6 (FIG. 1) which serves as a filter network to prevent false triggering of the timer. Pin MR, serially connected through resistor R16, is then driven high causing output Q at pin 8 to go high turning on the fan motor as will be explained in more detail below. When pin MR goes low upon removal of the signal on Y output Q will remain high until the expiry of the second, relatively long time delay, selected by the AB input, typically 60 seconds keeping the fan on for that extended period of time.

Diode CR6 in parallel with resistor R12 allows the circuit to continue to operate in the event that power from the power supply is interrupted by dumping the voltage stored therein into the 5 volt supply on line 22. Resistor R11, a 10K ohm resistor connected between line 22 and ground ensures that the 5 volt supply is decreased in a timely manner thereby avoiding the possibility of attempting to turn on the fan when there is insufficient power. Resistor R9 coupled to the MR signal is a pull down resistor to ground to provide discharge of capacitor C6 as well as serve as an emitter resistance for the output transistor Q3 to ensure that if transistor Q3 is off that MR goes to ground. Resistor R10 is a current limiting resistor for transistor Q2.

Figure 5:
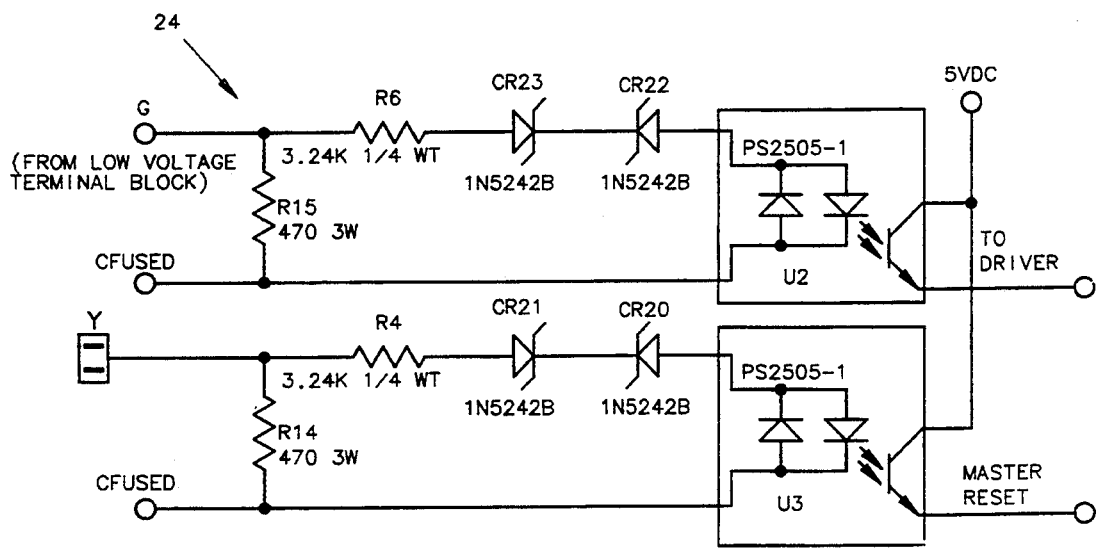
Fig. 5 is an enlarged input isolation circuit portion of FIG. 1.
Figure 6:
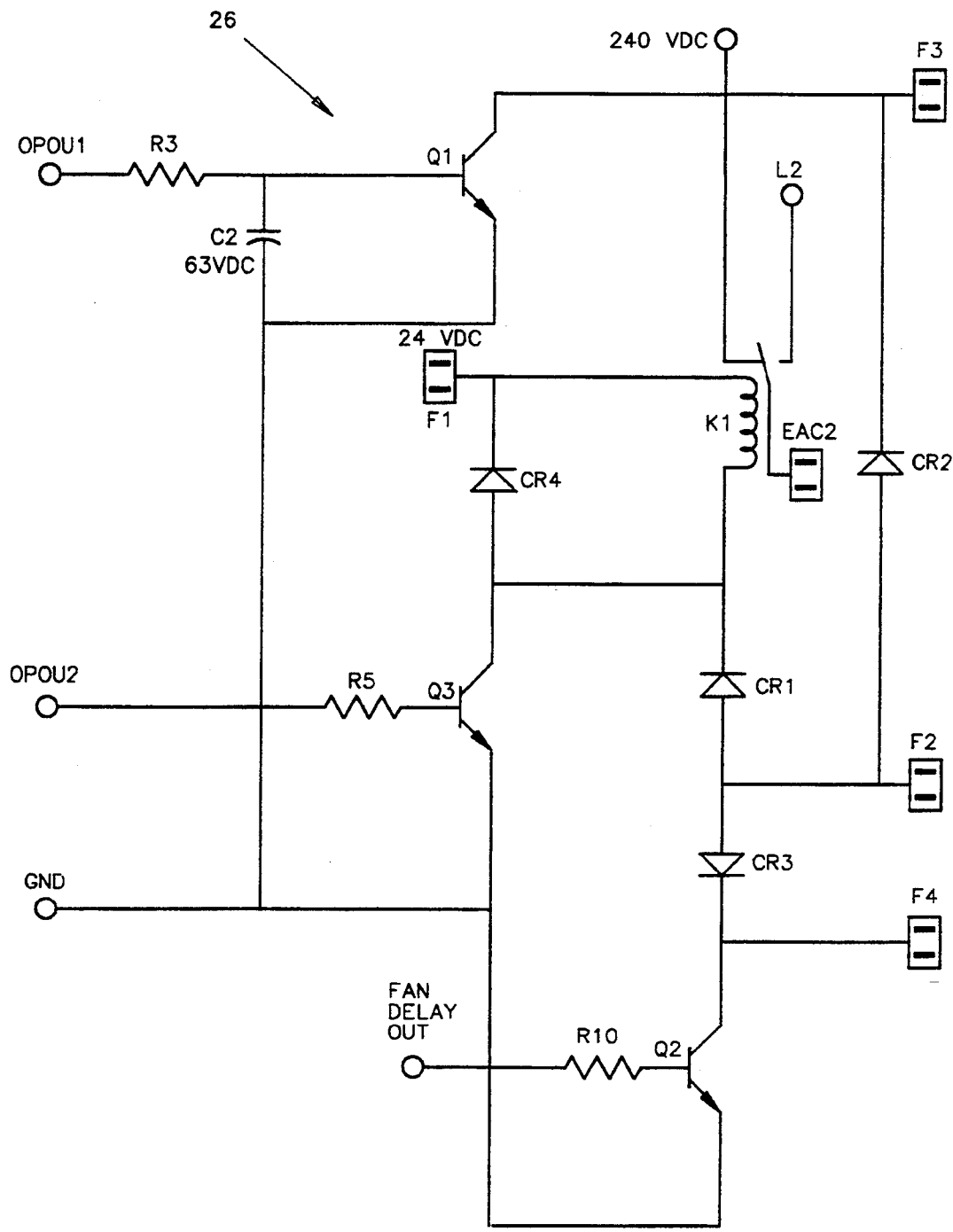
FIG. 6 is an enlarged output circuit portion of FIG. 1.

Input isolation circuit 24, FIG. 5, and output circuit 26, FIG. 6, comprise optically coupled isolators U2 and U3, PS2505-1 (NEC) having an AC input. A pair of back to back zener diodes CR23, CR22 and CR21, CR20 are provided in the respective signal lines of G and Y to act as voltage discriminators set at 12 volts apiece so that anytime the input signal between G and C is above 12 volts U2 will be energized and in like manner anytime the input signal between Y and C is above 12 volts U3 will be energized. Resistors R6 and R4 serve as current limiters to prevent excessive input into the optically coupled isolators. Resistors R15 and R14 for isolators U2, U3 respectively act as pull down resistors for the G and Y signals and provide compatibility of the circuit for use with electronic thermostats. When a signal appears on line G or Y an RMS AC current of 10 milliamperes are conducted through the infrared LED internal to the isolator which causes emission driving the photo transistor into the on state thereby converting the AC input signal to DC without any filtering, rectification or the like and avoiding problems associated with improper ground connections.

Optically coupled isolator U3 is coupled to the MR pin of timer U4 through resistor R16, as stated supra, with output Q coupled to the base of NPN transistor Q2 through current limiting resistor R10. Optically coupled isolator U2 is coupled to NPN transistor Q3 through current limiting resistor R5 and is adapted to drive 5 volts DC into resistor R5 and turn on transistor Q3.

A detector circuit 28, FIG. 1, comprises optically coupled isolator U1 in a somewhat different manner. Isolator U1 is used to detect a 240 volt AC input signal between lines L1 and ACINT. An AC interlock line, ACINT, is a common contact of the first stage electric heat control (driven by W2DC and W2GND) so that whenever the first stage heat control is energized, ACINT is also energized. The input of isolator U1 is serially connected through resistor R2, capacitor C1 back to L1. Capacitor C1 is an AC line rated capacitor which serves as impedance to limit current flow into isolator U1. Resistor R2 is also connected to the input of isolator U1 to prevent excessive current surges, which may be caused, for example, by a partially energized capacitor on contact bounce of the ACINT signal, from damaging isolator U1. Resistor R1 connected between line L1 and line ACINT provides a path for any long term voltage stored in capacitor C1 to discharge to avoid the possibility of shocking someone servicing the board.

As mentioned above, the ACINT line becomes energized whenever the first stage electric heat comes on and when this occurs the output transistor of isolator U1 becomes saturated which connects 5 volts to resistor R3 which is a current limiting resistor in the base of an NPN transistor Q1. This charges capacitor C2 which is connected between the base of transistor Q1 and ground. Capacitor C2 serves as a filter maintaining a continuous charge to drive transistor Q1 keeping it on when the AC wave passes through zero current level. When transistor Q1 is on the heat or medium speed of the fan motor is selected (tap F3).

Module 10 is provided with an electronic air cleaner relay coil K1 which is connected to the 24 volt DC power supply through transistor Q3. Also connected to the coil of relay K1 is an on/off tap F2 through diode CR1. Tap F2 is connected to tap F3 through diode CR2 and to transistor Q2 and tap F4 of the high speed signal through diode CR3. Relay K1 has a normally closed contact connecting tap EAC2 with line ACINT and when energized the movable contact connects EAC2 with line L2. Relay K1 is driven with full wave rectified 24 volt power, i.e. without any filter capacitor which facilitates the use of the referenced diodes in driving the several control signals.

Whenever 24 volts AC is applied only from line G to C current flows through R6 and the input to isolator U2 turning it on and in turn turning transistor Q3 on. Current through transistor Q3 will sink current through diode CR1 from the on/off terminal F2 of the fan motor thereby activating the low speed.

If 24 volts AC is applied to line Y, isolator U3 is activated in a corresponding manner resulting in pin MR of timer U4 going high and in turn output Q going high thereby turning on transistor Q2 which will sink current from the high speed terminal F4 resulting in high speed of the fan ECM. Transistor Q2 will also sink current through diode CR3 from the on/off terminal F2 if line G has not been activated. This ensures that the motor is on. If 240 volts AC is applied to line ACINT energizing the electric heat then isolator U1 will be activated turning on transistor Q1 which will sink current from the heat terminal F3 resulting in medium speed of the fan motor. If line G is not energized then current will sink from the on/off terminal F2 through diode CR2 so that the fan motor will be on when the electric heat is energized.

Diode CR1 also serves as a blocking diode ensuring that in the event that another signal is turned on that the relay K1 is not turned on without energizing transistor Q3 turning on the fan motor. Whenever the fan is on the electronic air cleaner, terminal EAC2, is on. The normally closed contact of relay K1 connects EAC2 to ACINT line. Thus, if the first stage of the electric heat is on the circuit ensures that the fan is energized with the electronic air cleaner being energized through normally closed contacts of relay K1. Upon energization of the relay then line L2 is connected to terminal EAC2 which occurs only when the fan on/off signal is present.

The following components were used in a module made in accordance with the invention:

| Dower supply circuit portion 14 | |
| --- | --- |
| diodes CR7, CR8, CR9 CRI8, CR19 | 1N4007 |
| capacitor C5 | 2.2 uf, 63VDC electrolytic |
| resistor R13 | 1K ohm, 1 watt, 5% TOL, metal film |
| diode CR5 | 5.1 volt zener, 1N523B |
| diode interlock circuit portion 16 | |
| diodes CRIO through CR17 | 1N4007 |
| connector 18 | 12 pin connector |
| terminal board 12 | low voltage terminal board |
| jumper JW1, JW2 | low voltage jumper |
| time delay circuit portion 20 | |
| resistors R12, R8 | 402K ohm, ¼ watt, 1% TOL, metal film |
| diode CR6 | 1N4007 |
| capacitor C4 | 2.2 uf, 63VDC electrolytic |
| capacitor C3 | .0056 uf, 5OVDC, monolithic |
| resistor R7 | 215K ohm, ¼ watt, 1% TOL, metal film |
| resistor R10 | 10K ohm, ¼ watt, 1% TOL, metal film |
| IC U4 | CD4541 CMOS programmable timer |
| input isolation circuit portion 24 | |
| resistors R14, R15 | 470 ohm, 3 watt, 5% TOL, metal film |
| resistors R4, R6 | 3.24K ohm, 1/4 watt, 1% TOL, metal film |
| diodes CR20 through CR23 | 12V zener IN5242B |
| IC's U2, U3 | PS 2505-1 optically coupled isolators |
| detector circuit portion 28 | |
| IC U1 | PS 2505-1 optically coupled isolator |
| output circuit portion 26 | |
| terminals F1 through F4 | low voltage quick connects |
| terminal EAC1 | high voltage quick connect |
| transistors Q1 through Q3 | MPSA06 NPN |
| relay K1 | AZ8, 24VDC |
| resistors R3, R5, R10 | 3.24K ohm, ¼ watt, 1% TOL, metal film |
| diodes CR1 through CR4 | 1N4007 |
| capacitor C2 | 2.2 uf, 63VDC electrolytic |

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

We claim:

1. An interface circuit for a variable speed electrically commutated fan motor comprising a low voltage terminal board having a plurality of terminals, a first terminal for a 24 volt AC compressor energization signal, a second for a 24 volt continuous fan energization signal, and at least one terminal for a 24 volt AC electric heat stage energization signal, a power supply for providing a 24 volt DC source and a 5 volt DC source, a connector having an input from the electric heat stage energization signal and having a 240 volt AC line output, the 240 volt AC line being energized whenever the electric heat stage is energized, a first optically coupled isolator having an input coupled to the 240 volt AC line output of the connector, the output of the first isolator being connected to the 5 volt DC source and the base of a transistor the main electrodes of which are coupled to the 24 volt DC source and to a medium speed terminal of the motor so that when the first optically coupled isolator is energized it connects the 5 volt DC source to the base of the transistor turning on the transistor and energizing the medium speed terminal, a second optically coupled isolator having an input coupled to the continuous fan energization signal line, the output of the second isolator being connected to the 5 volt DC source and the base of a second transistor the main electrodes of which are coupled to the 24 volt DC source and to a low speed, on/off terminal of the motor so that when the second optically coupled isolator is energized it connects the 5 volt DC source to the base of the second transistor turning on the second transistor and energizing the low speed terminal, and a third optically coupled isolator having an input coupled to the compressor energization signal line, the output of the isolator being connected to the 5 volt DC source and being coupled to the base of a third transistor the main electrodes of which are coupled to the 24 volt DC source and to a high speed terminal of the motor so that when the third optically coupled isolator is energized it causes the third transistor to turn on energizing the high speed terminal.

2. An interface circuit according to claim 1 further including fan deenergization delay timer means comprising a timing circuit having an input connected to the output of the third optically coupled isolator, the timing circuit having an output connected to the base of the third transistor, the timing circuit adapted to provide an output high when its input goes high and to maintain the output high for a selected period of time following its input going low to maintain the high speed fan energization for the said selected period of time after the signal from the low voltage terminal board has been removed.

3. An interface circuit according to claim 1 further including diode means interconnecting the low speed, on/off terminal with the medium speed terminal and the high speed terminal so that whenever the high speed terminal or the medium speed terminal is on the fan will be energized without energization of the low speed signal at the low voltage terminal board.

4. An interface circuit according to claim 3 in which a diode is disposed between the low and medium speed terminals with the anode attached to the low speed terminal.

5. An interface circuit according to claim 3 in which a diode is disposed between the low and high speed terminals with the anode attached to the low speed terminal.

6. An interface circuit according to claim 1 further including a relay having a coil coupled between the 24 volt DC power source and the collector of the second transistor, the relay having a normally closed contact in a line connecting an electronic air cleaner terminal to an AC interlock line and adapted when the coil is energized to move into engagement with the AC power line so that whenever the second transistor is on and the fan energized the electronic air cleaner terminal is energized.

7. An interface circuit according to claim 6 in which the coil is coupled to the low speed fan terminal through a diode with the anode attached to the low speed fan terminal.

8. An interface circuit relay according to claim 1 including a plurality of electric heat stage energization signals and further including a diode interlock network disposed between the plurality of electric heat stage energization signals and the connector, the diode interlock having an input connected to the connector which is energized whenever any one of the electric heat stage energization signals is present.

9. An interface circuit for a variable speed electrically commutated fan motor having a 240 volt AC line adapted for connection with electric heat means, a plurality of low voltage AC signal lines relating to different fan speeds of the motor comprising a first optically coupled isolator having a 240 volt AC input coupled to the 240 volt AC line so that the isolator is energized whenever the electric heat means is energized, the output of the optically coupled isolator being coupled to a medium speed tap of the motor and being adapted to turn on the medium speed when energized.

10. An interface circuit according to claim 9 further including a second optically coupled isolator having a 24 volt AC input coupled to one of said plurality of low voltage AC lines so that second isolator is energized whenever the said one of said plurality of low voltage AC lines is energized, the output of the second optically coupled isolator being coupled to another speed tap of the motor.

11. An interface circuit according to claim 10 further including a third optically coupled isolator having a 24 volt AC input coupled to another of said plurality of low voltage AC lines so that the third isolator is energized whenever the said another of said plurality of low voltage AC lines is energized, the output of the third optically coupled isolator being coupled to yet another speed tap of the motor.

12. An interface circuit for a variable speed electrically commutated fan motor having a 240 volt AC line adapted for connection with electric heat means comprising a plurality of low voltage signal lines, a first of the signal lines signifying compressor energization, a second of the signal lines signifying continuous fan energization and a third of the signal lines signifying electric heat stage energization, a first optically coupled isolator having an input coupled to the 240 volt AC line, the output of the first isolator being connected to a medium speed terminal of the motor and being adapted to turn on the motor to the medium speed when energized, a second optically coupled isolator having an input coupled to the second of the signal lines, the output of the second isolator being connected to a low speed tap terminal of the motor and being adapted to turn on the motor to the low speed when energized, a third optically coupled isolator having an input coupled to the third of the signal lines, the output of the third isolator being connected to a high speed terminal of the motor and being adapted to turn on the motor to the high speed when energized, and diode means interconnecting the low speed terminal with the medium speed terminal and the high speed terminal so that whenever the high speed terminal or the medium speed terminal is energized the fan will be energized without energization of the low speed signal.

* * * * *